March 7, 1950      A. F. LOCKWOOD      2,499,659

SWIVEL COUPLER FOR GREASE GUNS

Filed Jan. 5, 1948

INVENTOR
ARLIE F. LOCKWOOD

BY

ATTORNEY

Patented Mar. 7, 1950

2,499,659

UNITED STATES PATENT OFFICE 2,499,659

SWIVEL COUPLER FOR GREASE GUNS

Arlie F. Lockwood, Portland, Oreg.

Application January 5, 1948, Serial No. 554

1 Claim. (Cl. 285—97.6)

This invention relates generally to lubricating devices and particularly to a swivel coupler for grease guns.

The main object of this invention is to provide a means for expediting the use of an ordinary grease gun by making accessible fittings which are ordinarily reached only with difficulty, thereby overcoming the tendency to skip the lubrication of such fittings.

The second object is to construct a coupler in curved form in order that it may be turned to any position for proper alignment with the fittings.

The third object is to insure a more complete servicing of all fittings whether accessible or not and which requires no lock or latch to hold it in place, owing to its natural positioning.

The fourth object is to produce a self-aligning fitting which can be turned to any desired angle where it will be frictionally held.

I accomplish these and other objects in the manner set forth in the following specification as illustrated in the accompanying drawing, in which.

Like numbers of reference refer to the same or similar parts throughout the several views.

Figure 1:
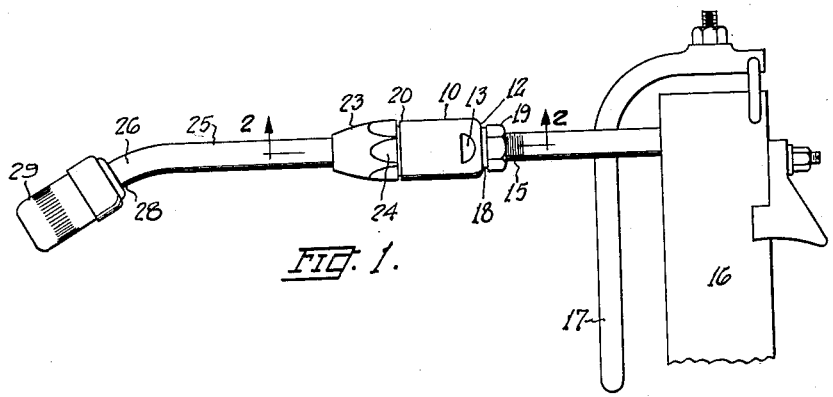
Fig. 1 is a side elevation of the device showing it in position on greasing equipment.
Figure 2:
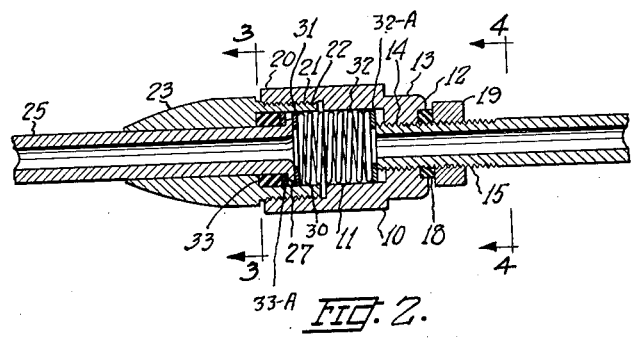
Fig. 2 is a fragmentary enlarged section taken along the line 2—2 in Fig. 1.
Figure 3:
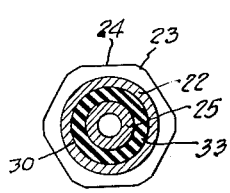
Fig. 3 is a transverse section taken along the line 3—3 in Fig. 2.
Figure 4:
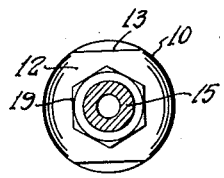
Fig. 4 is a transverse section taken along the line 4—4 in Fig. 2.

Referring in detail to the drawing, there is shown a cylindical body 10 having a cylindrical spring chamber 11 formed therein.

The end 12 is provided with flat spots 13 adapted to receive a wrench. The end 12 is provided with a threaded opening 14 which receives the threaded stem 15 of the grease gun 16 provided with the control lever 17 such as is now in common use.

It is desirable to provide a packing washer 18 and locking nut 19 on the threaded stem 15 in order to insure against leakage around the threads.

The end 20 of the body 10 has formed therein an internally threaded opening 21 into which is threaded the shank 22 of the cap 23 which is provided with flat spots 24 for engagement with a wrench. The threaded shank 22 has formed therein a bore 30, equaling in diameter the chamber 11.

Rotatably mounted in the cap 23 is the tube 25 having the bend 26 formed between the flanged end 27 and the end 28 and having the usual fitting engaging chuck 29 mounted thereon.

Within the bore 30, and against the flanged end 27, is placed a wearing washer 31, against which bears a spring 32, against whose opposite end is placed a washer 32—A, whose position is fixed by the elongated threaded stem 15.

Between the flanged end 27 and the inner end of the bore 30 is placed a soft sealing washer 33 and a metal wearing washer 33—A, the latter contacting the flanged end 27.

The operation of the device is the same as any other grease gun except if a fitting is to be reached in a position rendered difficult, due to the somewhat fixed relationship between the gun 16 and the axis of the chuck 29, it is only necessary to swing the chuck 29 on the axis of the stem 15 until the desired position is gained. While the pressure is not applied to the lubricant, the chuck 29 can be rotated with sufficient freedom, but when pressure is applied then the washers 31 and 33 effectively resist rotation and completely seal the coupler against leakage. The ease with which the tube 25 can be turned is controlled by the compression of the spring 32 and this is controlled by the stem 15.

It can be seen that any desired frictional setting can be maintained by the locking nut 19. Obviously, if the stem 15 is screwed into the member 10 until the coils of the spring 32 touch, then the member 25 cannot rotate with relation to the stem 15 when the fitting is not under pressure or when it is under pressure.

I am, of course, aware that numerous forms of swivel couplers for grease guns have been constructed in the past. I, therefore, do not claim such devices broadly, but I do intend to cover such forms and modifications thereof as fall fairly within the appended claim.

I claim:

A coupler of the class described, consisting of a chambered body having a threaded stem rotatably extending into its inlet end and having a flanged tube rotatably occupying its outlet end, a sealing washer and wearing washer on said tube with the wearing washer engaging the tube flange, a spring between the tube flange and the end of said threaded stem, and means frictionally holding and sealing said stem with relation to said body.

ARLIE F. LOCKWOOD.

REFERENCES CITED

The following references are of record in the file of this patent:

UNITED STATES PATENTS

| Number | Name | Date |
|---|---|---|
| 1,285,291 | McLaughlin | Nov. 19, 1918 |
| 1,851,342 | Bacher | Mar. 29, 1932 |